(12) United States Patent
Yoshida et al.

(10) Patent No.: US 12,305,055 B2
(45) Date of Patent: May 20, 2025

(54) METHOD FOR MANUFACTURING ELECTRICALLY CONDUCTIVE MEMBER

(71) Applicant: KAO CORPORATION, Tokyo (JP)

(72) Inventors: Tomohide Yoshida, Wakayama (JP); Kosuke Muto, Sakai (JP)

(73) Assignee: KAO CORPORATION, Tokyo (JP)

( * ) Notice: Subject to any disclaimer, the term of this patent is extended or adjusted under 35 U.S.C. 154(b) by 299 days.

(21) Appl. No.: 17/605,923

(22) PCT Filed: Apr. 26, 2019

(86) PCT No.: PCT/JP2019/018071
§ 371 (c)(1),
(2) Date: Oct. 22, 2021

(87) PCT Pub. No.: WO2020/217491
PCT Pub. Date: Oct. 29, 2020

(65) Prior Publication Data
US 2022/0220330 A1 Jul. 14, 2022

(51) Int. Cl.
| | | |
|---|---|---|
| B41J 2/00 | (2006.01) | |
| B41M 3/00 | (2006.01) | |
| C09D 11/033 | (2014.01) | |
| C09D 11/037 | (2014.01) | |
| C09D 11/107 | (2014.01) | |
| C09D 11/322 | (2014.01) | |
| C09D 11/36 | (2014.01) | |
| C09D 11/52 | (2014.01) | |
| H01B 1/22 | (2006.01) | |
| B05D 1/26 | (2006.01) | |
| B05D 5/12 | (2006.01) | |

(52) U.S. Cl.
CPC ............. *C09D 11/52* (2013.01); *B41M 3/006* (2013.01); *C09D 11/033* (2013.01); *C09D 11/037* (2013.01); *C09D 11/107* (2013.01); *C09D 11/322* (2013.01); *C09D 11/36* (2013.01); *H01B 1/22* (2013.01); *B05D 1/26* (2013.01); *B05D 5/12* (2013.01); *B41J 2/00* (2013.01)

(58) Field of Classification Search
CPC .......... H01B 1/22; B41M 3/006; C09D 11/52; C09D 11/033; C09D 11/037; C09D 11/107; C09D 11/322; C09D 11/36; B05D 1/26; B41J 2/00
USPC ....................................................... 427/123
See application file for complete search history.

(56) References Cited

U.S. PATENT DOCUMENTS

| | | | | |
|---|---|---|---|---|
| 4,842,993 A | * | 6/1989 | Yagihara ................ | G03C 7/413 430/467 |
| 2010/0078208 A1 | | 4/2010 | Inoue | |
| 2010/0239749 A1 | * | 9/2010 | Yoshida ............... | H05K 3/1283 427/97.3 |
| 2012/0267151 A1 | | 10/2012 | Hojo et al. | |
| 2014/0054515 A1 | * | 2/2014 | Lowenthal ...... | H01L 31/022466 252/514 |
| 2015/0098165 A1 | * | 4/2015 | Suzuki ................... | H01G 4/012 252/514 |
| 2017/0088725 A1 | * | 3/2017 | Krishnan .............. | C09D 11/03 |
| 2017/0158890 A1 | * | 6/2017 | Hirose ................... | C09D 11/38 |
| 2017/0369722 A1 | | 12/2017 | Bruinsma et al. | |
| 2018/0030297 A1 | * | 2/2018 | Oda ....................... | C09D 11/36 |
| 2019/0341364 A1 | * | 11/2019 | Fathi ...................... | B32B 17/00 |

FOREIGN PATENT DOCUMENTS

| | | |
|---|---|---|
| CN | 102596455 A | 7/2012 |
| CN | 107406698 A | 11/2017 |
| JP | 2002-155261 A | 5/2002 |
| JP | 2004-127851 A | 4/2004 |
| JP | 2008-4375 A | 1/2008 |
| JP | 2009-76455 A | 4/2009 |
| JP | 2010-245497 A | 10/2010 |
| JP | 2012-143871 A | 8/2012 |
| JP | 2014-107484 A | 6/2014 |
| JP | 2015-46369 | 3/2015 |
| JP | 2015-49988 | 3/2015 |
| JP | 2018-34500 A | 3/2018 |
| JP | 2018-41697 A | 3/2018 |
| WO | WO 2016/051695 A1 | 4/2016 |

OTHER PUBLICATIONS

International Search Report issued on Jul. 16, 2019 in PCT/JP2019/018071 filed on Apr. 26, 2019, 2 pages.
Corsino et al., "Room temperature sintering of printer silver nanoparticle conductive ink", IOP Conf. Series: Materials Science and Engineering, ICBMM 2017, vol. 264, 6 pages.
Extended European Search Report issued Sep. 20, 2022 in European Patent Application No. 19925778.3, 6 pages.

\* cited by examiner

*Primary Examiner* — Brian K Talbot
(74) *Attorney, Agent, or Firm* — Oblon, McClelland, Maier & Neustadt, L.L.P.

(57) ABSTRACT

The present invention relates to a method for producing an electrically conductive member which includes the step of applying an electrically conductive ink containing a metal fine particle dispersion to a substrate to form electrically conductive images on the substrate under ordinary-temperature environments, thereby obtaining the electrically conductive member, in which the metal fine particle dispersion contains metal fine particles (a) dispersed therein with a polymer B; a glass transition temperature of the polymer B is not higher than a temperature at which the electrically conductive images are formed on the substrate; and the substrate has a porous surface.

11 Claims, No Drawings

METHOD FOR MANUFACTURING ELECTRICALLY CONDUCTIVE MEMBER

FIELD OF THE INVENTION

The present invention relates to a method for producing an electrically conductive member.

BACKGROUND OF THE INVENTION

In printed electronics technologies in which an electronic device is manufactured by printing technologies, attempts have been made to utilize metal fine particles as a material for forming wiring cables, electrodes, etc.

For example, JP 2004-127851A (Patent Literature 1) aims at providing an electrically conductive coating film composite body that is capable of exhibiting high electrical conductivity either without heating or by heating at a low temperature upon production of the composite body, and can be formed even on a substrate having poor heat resistance, as well as a method for producing the composite body, and discloses an electrically conductive coating film composite body that includes a receptive layer containing at least a porous inorganic filler, and an electrically conductive coating film formed by applying a metal colloid solution to the receptive layer and drying the solution, in which the receptive layer and the electrically conductive coating film are contacted with each other, as well as a method for forming the composite body.

JP 2008-4375A (Patent Literature 2) aims at providing an electrical conductivity-developing method in which the electrical conductivity is attained without conducting such a baking step as required conventionally, as well as an electrically conductive member, and discloses an electrical conductivity-developing method in which metal ultrafine particles being dispersed in the form of a metal colloid in water and/or an organic solvent are reacted with a compound containing a halogen in a molecule thereof by ionic bond to develop electrical conductivity on a substrate, as well as an electrically conductive member that is allowed to develop electrical conductivity by the method.

SUMMARY OF THE INVENTION

The present invention relates to a method for producing an electrically conductive member which includes the step of applying an electrically conductive ink containing a metal fine particle dispersion to a substrate to form electrically conductive images on the substrate under ordinary-temperature environments, thereby obtaining the electrically conductive member, in which the metal fine particle dispersion contains metal fine particles (a) dispersed therein with a polymer B;
a glass transition temperature of the polymer B is not higher than a temperature at which the electrically conductive images are formed on the substrate; and
the substrate has a porous surface.

DETAILED DESCRIPTION OF THE INVENTION

In printed electronics technologies, electrically conductive images have been conventionally formed by sintering metal fine particles applied onto a substrate under high-temperature conditions. However, with the spread of applications of electrically conductive members, it has also been required to apply the aforementioned technologies to a low-heat resistant substrate, a flexible substrate or the like. Thus, there is an increasing demand for a method for producing an electrically conductive member that is capable of forming electrically conductive images thereon using metal fine particles even under ordinary-temperature environments, and is also excellent in bending resistance.

In Examples of the Patent Literature 1, as a dispersant for the metal colloid solution, there is used a low-molecular weight sodium citrate dihydrate, and therefore the resulting material tends to be insufficient in electrical conductivity. In the technology described in the Patent Literature 2, although the technology needs no sintering step to be conducted under high-temperature conditions, it is required that the compound containing a halogen in a molecule thereof by ionic bond is separately used in order to allow the resulting material to develop electrical conductivity.

In addition, in general, a metal thin film tends to be insufficient in durability against bending deformation owing to an external force applied thereto. For this reason, when applying the aforementioned technologies to a flexible substrate, electrically conductive images in the form of such a metal thin film tend to suffer from occurrence of cracks upon bending the electrically conductive member, or occurrence of peeling from the substrate, so that the resulting electrically conductive member tends to be deteriorated in electrical conductivity. In consequence, it has also been required that the electrically conductive member is improved in bending resistance.

The present invention relates to a method for producing an electrically conductive member on which electrically conductive images that have ordinary-temperature sintering properties and are excellent in electrical conductivity and bending resistance are formed.

Meanwhile, in the present invention, the term "ordinary-temperature sintering properties" as used herein means that the metal fine particles undergo necking therebetween and are bonded to each other under ordinary-temperature environments, and the expression "under ordinary-temperature environments" means "under environments in a temperature range of not lower than 5° C. and not higher than 45° C.".

The present inventors have noticed that by using a metal fine particle dispersion containing metal fine particles dispersed therein with a polymer having a glass transition temperature that falls within a predetermined range as well as using a substrate having a porous surface, necking between the metal fine particles is allowed to proceed even under ordinary-temperature environments so as to develop electrical conductivity, and further the resulting electrically conductive member can be improved in bending resistance. Thus, the present inventors have found that by using the aforementioned metal fine particle dispersion and substrate, it is possible to obtain an electrically conductive member that is excellent in electrical conductivity and bending resistance.

That is, the present invention relates to a method for producing an electrically conductive member which includes the step of applying an electrically conductive ink containing a metal fine particle dispersion to a substrate to form electrically conductive images on the substrate under ordinary-temperature environments, thereby obtaining the electrically conductive member, in which the metal fine particle dispersion contains metal fine particles (a) dispersed therein with a polymer B;
a glass transition temperature of the polymer B is not higher than a temperature at which the electrically conductive images are formed on the substrate; and
the substrate has a porous surface.

In accordance with the present invention, it is possible to provide a method for producing an electrically conductive member on which electrically conductive images that have ordinary-temperature sintering properties and are excellent in electrical conductivity and bending resistance are formed.

[Method for Producing Electrically Conductive Member]

The method for producing an electrically conductive member according to the present invention includes the step of applying an electrically conductive ink containing a metal fine particle dispersion to a substrate to form electrically conductive images on the substrate under ordinary-temperature environments, thereby obtaining the electrically conductive member, in which the metal fine particle dispersion contains metal fine particles (a) dispersed therein with a polymer B; a glass transition temperature of the polymer B is not higher than a temperature at which the electrically conductive images are formed on the substrate; and the substrate has a porous surface.

In the present invention, the metal fine particle dispersion is prepared by dispersing the metal fine particles (a) in a medium with the polymer B.

According to the present invention, it is possible to obtain an electrically conductive member on which electrically conductive images that have ordinary-temperature sintering properties and are excellent in electrical conductivity and bending resistance are formed. The reason why the aforementioned advantageous effects can be attained by the present invention is considered as follows, though it is not clearly determined yet.

That is, the electrically conductive ink used in the present invention contains the metal fine particle dispersion.

The polymer B used for dispersing the metal fine particles has a glass transition temperature not higher than a temperature at which the electrically conductive images are formed, and also has a flexible structure even under ordinary-temperature environments. Furthermore, it is considered that since the substrate used herein has a porous surface, the polymer B is desorbed from the surface of the respective metal fine particles owing to a capillary force of the porous surface even under ordinary-temperature environments and transferred to the substrate, so that the metal fine particles undergo necking therebetween, whereby it is possible to form images that are capable of exhibiting ordinary-temperature sintering properties and high electrical conductivity. In addition, it is considered that since the thus formed electrically conductive images have adequate irregularities or voids, the effect of causing deformation of the resulting electrically conductive member, such as bending deformation thereof, etc., can be relaxed, so that the resulting electrically conductive member can also be improved in bending resistance.

<Electrically Conductive Ink>

(Metal Fine Particles (a))

Examples of the metal (metal atom) constituting the metal fine particles (a) according to the present invention include Group 4 transition metals such as titanium, zirconium, etc.; Group 5 transition metals such as vanadium, niobium, etc.; Group 6 transition metals such as chromium, molybdenum, tungsten, etc.; Group 7 transition metals such as manganese, technetium, rhenium, etc.; Group 8 transition metals such as iron, ruthenium, etc.; Group 9 transition metals such as cobalt, rhodium, iridium, etc.; Group 10 transition metals such as nickel, palladium, platinum, etc.; Group 11 transition metals such as copper, silver, gold, etc.; Group 12 transition metals such as zinc, cadmium, etc.; Group 13 metals such as aluminum, gallium, indium, etc.; Group 14 metals such as germanium, tin, lead, etc.; and the like. As the metal constituting the metal fine particles (a), one kind of metal may be used alone as a single metal, or two or more kinds of metals may be used in combination with each other in the form of an alloy.

Among these metals, preferred are those transition metals belonging to Groups 4 to 11 in the 4th to 6th Periods of the Periodic Table, more preferred are copper, and noble metals such as gold, silver, platinum, palladium, etc., even more preferred is at least one Group 11 transition metal selected from the group consisting of copper, silver and gold, and further even more preferred is silver. The kind of metal used in the electrically conductive member may be determined by inductively coupled plasma atomic emission spectroscopy.

The average particle size of the metal fine particles (a) contained in the metal fine particle dispersion is preferably not less than 5 nm, more preferably not less than 10 nm and even more preferably not less than 15 nm from the viewpoint of improving ordinary-temperature sintering properties of the metal fine particles as well as from the viewpoint of improving electrical conductivity and bending resistance of the resulting electrically conductive member, and is also preferably not more than 100 nm, more preferably not more than 80 nm, even more preferably not more than 60 nm, further even more preferably not more than 40 nm and still further even more preferably not more than 35 nm from the viewpoint of forming the electrically conductive images with a fine pattern. The average particle size may be measured by the method described in Examples below.

(Polymer B)

In the present invention, the polymer B has a function capable of dispersing the metal fine particles (a).

From the viewpoint of improving dispersibility of the metal fine particles, it is preferred that the polymer B contains a hydrophilic group, and it is more preferred that the polymer B contains the hydrophilic group on a side chain of the polymer B. Examples of the hydrophilic group include anionic groups, e.g., groups that are capable of releasing hydrogen ions upon dissociation thereof to allow the polymer to exhibit acidity, such as a carboxy group (—COOM), a sulfonic acid group (—SO$_3$M), a phosphoric acid group (—OPO$_3$M$_2$), etc., or dissociated ion forms of these groups (such as —COO$^-$, —SO$_3^-$, —OPO$_3^{2-}$ and —OPO$_3^-$M), etc.; nonionic groups such as a hydroxy group, an amide group, an oxyalkylene group, etc.; cationic groups such as protonic acid salts of a primary, secondary or tertiary amino group, a quaternary ammonium group, etc.; and the like. In the aforementioned chemical formulae, M represents a hydrogen atom, an alkali metal, ammonium or an organic ammonium.

From the viewpoint of improving ordinary-temperature sintering properties of the metal fine particles as well as from the viewpoint of improving electrical conductivity and bending resistance of the resulting member, as the polymer B, preferred is an anionic group-containing polymer or a nonionic group-containing polymer. As the basic structure of the polymer B, there may be mentioned a vinyl polymer such as an acrylic resin, a styrene-based resin, a styrene-acrylic resin, an acrylic silicone-based resin, etc.; a condensation-based polymer such as a polyester, a polyurethane, etc.; and the like. Among these polymers, preferred is a vinyl polymer.

As the polymer B, from the same viewpoint as described above, more preferred is an anionic group-containing polymer, and even more preferred is an anionic group-containing vinyl polymer.

These polymers B may be used alone or in combination of any two or more thereof.

In addition, if the polymer B is in the form of a copolymer, the copolymer may be in the form of any of a block copolymer, a random copolymer and an alternating copolymer.

The polymer B may be either water-soluble or water-insoluble. However, from the viewpoint of improving ordinary-temperature sintering properties of the metal fine particles as well as from the viewpoint of improving electrical conductivity and bending resistance of the resulting member, the polymer B is preferably a water-insoluble polymer, more preferably at least one polymer selected from the group consisting of a water-soluble vinyl polymer, a water-soluble polyester and a water-soluble polyurethane, and even more preferably a water-soluble vinyl polymer.

The term "water-soluble" of the polymer B as used in the present invention means that when the polymer is dried to a constant weight at 105° C. for 2 hours and then dissolved in 100 g of water at 25° C., a solubility in water of the polymer is more than 10 g. The term "water-insoluble" of the polymer B as used herein means that when the polymer is dried to a constant weight at 105° C. for 2 hours and then dissolved in 100 g of water at 25° C., a solubility in water of the polymer is not more than 10 g.

In the case where the polymer B is an anionic group-containing polymer, the solubility thereof means a solubility in water of the polymer B whose anionic groups are neutralized completely, i.e., 100%, with sodium hydroxide. In the case where the polymer B is a cationic group-containing polymer, the solubility thereof means a solubility in water of the polymer B whose cationic groups are neutralized completely, i.e., 100%, with hydrochloric acid.

From the viewpoint of improving dispersibility of the metal fine particles as well as from the viewpoint of improving electrical conductivity and bending resistance of the resulting member, the polymer B is preferably a polymer containing a carboxy group on a side chain thereof, and more preferably a water-soluble vinyl polymer containing a constitutional unit derived from a carboxy group-containing monomer (b-1) and a constitutional unit derived from a polyalkylene glycol segment-containing monomer (b-2).

[Carboxy Group-Containing Monomer (b-1)]

The carboxy group contained in the monomer (b-1) is the same as described above.

Specific examples of the monomer (b-1) include unsaturated monocarboxylic acids such as (meth)acrylic acid, crotonic acid, 2-methacryloyloxymethylsuccinic acid, etc.; unsaturated dicarboxylic acids such as maleic acid, itaconic acid, fumaric acid, citraconic acid, etc.; and the like. Incidentally, the aforementioned unsaturated dicarboxylic acids may be in the form of an anhydride thereof. These monomers (b-1) may be used alone or in combination of any two or more thereof.

The monomer (b-1) is preferably at least one monomer selected from the group consisting of (meth)acrylic acid and maleic acid, and more preferably (meth)acrylic acid, from the viewpoint of improving dispersibility of the metal fine particles as well as from the viewpoint of improving electrical conductivity and bending resistance of the resulting member.

The term "(meth)acrylic acid" as used in the present specification means at least one compound selected from the group consisting of acrylic acid and methacrylic acid, and the "(meth)acrylic acid" is hereinlater also defined in the same way.

[Polyalkylene Glycol Segment-Containing Monomer (b-2)]

The monomer (b-2) is preferably a monomer that is capable of introducing a polyalkylene glycol segment into the polymer B as a side chain of the polymer B from the viewpoint of improving dispersibility of the metal fine particles as well as from the viewpoint of improving electrical conductivity and bending resistance of the resulting member. Examples of the monomer (b-2) include polyalkylene glycol monoesters of (meth)acrylate and the like. These monomers (b-2) may be used alone or in combination of any two or more thereof.

The polyalkylene glycol segment of the monomer (b-2) preferably contains a unit derived from an alkyleneoxide having not less than 2 and not more than 4 carbon atoms. Examples of the alkyleneoxide include ethyleneoxide, propyleneoxide, butyleneoxide and the like.

The number of the units derived from the alkyleneoxide in the aforementioned polyalkylene glycol segment is preferably not less than 2, more preferably not less than 5 and even more preferably not less than 10, and is also preferably not more than 100, more preferably not more than 70 and even more preferably not more than 50.

The aforementioned polyalkylene glycol segment is preferably a copolymer containing a unit derived from ethyleneoxide and a unit derived from propyleneoxide from the viewpoint of improving dispersibility of the metal fine particles as well as from the viewpoint of improving electrical conductivity and bending resistance of the resulting member. The molar ratio of the ethyleneoxide unit (EO) to the propyleneoxide unit (PO) [EO/PO] is preferably not less than 60/40, more preferably not less than 65/35 and even more preferably not less than 70/30, and is also preferably not more than 90/10, more preferably not more than 85/15 and even more preferably not more than 80/20.

The copolymer containing the unit derived from ethyleneoxide and the unit derived from propyleneoxide may be in the form of any of a block copolymer, a random copolymer and an alternating copolymer.

Specific examples of commercially available products of the monomer (b-2) include "NK ESTER AM-90G", "NK ESTER AM-130G", "NK ESTER AMP-20GY", "NK ESTER AMP-230G", "NK ESTER M-20G", "NK ESTER M-40G", "NK ESTER M-90G", "NK ESTER M-230G" and the like as products available from Shin-Nakamura Chemical Co., Ltd.; and "BLEMMER PE-90", "BLEMMER PE-200", "BLEMMER PE-350" and the like, "BLEMMER PME-100", "BLEMMER PME-200", "BLEMMER PME-400", "BLEMMER PME-1000", "BLEMMER PME-4000" and the like, "BLEMMER PP-500", "BLEMMER PP-800", "BLEMMER PP-1000" and the like, "BLEMMER AP-150", "BLEMMER AP-400", "BLEMMER AP-550" and the like, and "BLEMMER 50PEP-300", "BLEMMER 50POEP-800B", "BLEMMER 43PAPE-600B" and the like as products available from NOF Corporation.

[Hydrophobic Monomer (b-3)]

The polymer B is preferably a water-soluble vinyl polymer further containing a constitutional unit derived from a hydrophobic monomer (b-3) in addition to the constitutional unit derived from the monomer (b-1) and the constitutional unit derived from the monomer (b-2) from the viewpoint of improving dispersibility of the metal fine particles as well as from the viewpoint of improving electrical conductivity and bending resistance of the resulting member.

The term "hydrophobic" of the monomer (b-3) as used in the present invention means that a solubility in water of the monomer as measured by dissolving the monomer in 100 g of ion-exchanged water at 25° C. until reaching a saturation concentration thereof is less than 10 g. The solubility in water of the monomer (b-3) is preferably not more than 5 g and more preferably not more than 1 g from the viewpoint of improving dispersibility of the metal fine particles as well as from the viewpoint of improving electrical conductivity and bending resistance of the resulting member.

The monomer (b-3) is preferably at least one monomer selected from the group consisting of an aromatic group-containing monomer and a (meth)acrylate containing a hydrocarbon group derived from an aliphatic alcohol having not less than 1 and not more than 22 carbon atoms, and more preferably an aromatic group-containing monomer.

The term "(meth)acrylate" as used in the present specification means at least one compound selected from the group consisting of an acrylate and a methacrylate, and the "(meth)acrylate" is hereinafter also defined in the same way.

These monomers (b-3) may be used alone or in combination of any two or more thereof.

The aromatic group-containing monomer is preferably a vinyl monomer containing an aromatic group having not less than 6 and not more than 22 carbon atoms which may contain a substituent group containing a hetero atom, and more preferably at least one monomer selected from the group consisting of a styrene-based monomer and an aromatic group-containing (meth)acrylate. The molecular weight of the aromatic group-containing monomer is preferably less than 500.

Examples of the styrene-based monomer include styrene, α-methyl styrene, 2-methyl styrene, 4-methyl styrene, divinyl benzene and the like. Among these styrene-based monomers, preferred are styrene and α-methyl styrene.

As the aromatic group-containing (meth)acrylate, preferred are phenyl (meth)acrylate, benzyl (meth)acrylate, phenoxyethyl (meth)acrylate, etc., and more preferred is benzyl (meth)acrylate.

As the monomer (b-3), from the viewpoint of improving dispersibility of the metal fine particles as well as from the viewpoint of improving electrical conductivity and bending resistance of the resulting member, even more preferred is the styrene-based monomer, further even more preferred is at least one monomer selected from the group consisting of styrene, α-methyl styrene, 2-methyl styrene and 4-methyl styrene, and still further even more preferred is at least one monomer selected from the group consisting of styrene and α-methyl styrene.

(Contents of Respective Monomers in Raw Material Monomer or Contents of Respective Constitutional Units in Polymer B)

The contents of the aforementioned monomers (b-1) to (b-3) in the raw material monomer (contents of non-neutralized components; hereinafter defined in the same way) upon production of the polymer B, or the contents of the constitutional units derived from the monomers (b-1) to (b-3) in the polymer B, are as follows, from the viewpoint of improving dispersibility of the metal fine particles as well as from the viewpoint of improving electrical conductivity and bending resistance of the resulting member.

The content of the monomer (b-1) is preferably not less than 5 mol %, more preferably not less than 10 mol % and even more preferably not less than 15 mol %, and is also preferably not more than 40 mol %, more preferably not more than 35 mol % and even more preferably not more than 30 mol %.

The content of the monomer (b-2) is preferably not less than 1 mol %, more preferably not less than 5 mol % and even more preferably not less than 7 mol %, and is also preferably not more than 30 mol %, more preferably not more than 20 mol % and even more preferably not more than 15 mol %.

The content of the monomer (b-3) is preferably not less than 50 mol %, more preferably not less than 60 mol % and even more preferably not less than 65 mol %, and is also preferably not more than 90 mol %, more preferably not more than 85 mol % and even more preferably not more than 80 mol %.

The polymer B is preferably a water-soluble vinyl polymer that contains a constitutional unit derived from (meth)acrylic acid as the monomer (b-1) and a constitutional unit derived from a polyalkylene glycol monoester of (meth)acrylic acid as the monomer (b-2), and more preferably a water-soluble vinyl polymer that contains a constitutional unit derived from (meth)acrylic acid as the monomer (b-1), a constitutional unit derived from a polyalkylene glycol monoester of (meth)acrylic acid as the monomer (b-2) and a constitutional unit derived from a styrene-based monomer as the monomer (b-3).

As the polymer B, there may be used either a polymer obtained by copolymerizing the raw material monomer containing the monomer (b-1), the monomer (b-2) and the monomer (b-3) by conventionally known methods, or a commercially available product. Examples of the commercially available product of the polymer B include "DISPERBYK-190" and "DISPERBYK-2015" both available from BYK Chemie GmbH, and the like.

In the case where the aforementioned water-soluble vinyl polymer is used as the polymer B, the content of the water-soluble vinyl polymer in the polymer B is preferably not less than 60% by mass, more preferably not less than 70% by mass, even more preferably not less than 80% by mass and further even more preferably not less than 90% by mass, and is also preferably not more than 100% by mass, and furthermore preferably 100% by mass, from the viewpoint of improving dispersibility and ordinary-temperature sintering properties of the metal fine particles as well as from the viewpoint of improving electrical conductivity and bending resistance of the resulting member.

The number-average molecular weight of the polymer B is preferably not less than 1,000, more preferably not less than 2,000 and even more preferably not less than 3,000, and is also preferably not more than 100,000, more preferably not more than 50,000, even more preferably not more than 30,000, further even more preferably not more than 10,000 and still further even more preferably not more than 7,000. When the number-average molecular weight of the polymer B lies within the aforementioned range, adsorptivity of the polymer B onto the metal fine particles is sufficient, so that the metal fine particles can be improved in dispersion stability in the dispersion. In addition, upon forming the electrically conductive images on the substrate, since desorption of the polymer B from the metal fine particles is promoted, it is possible to develop high electrical conductivity of the resulting electrically conductive member even under ordinary-temperature environments, and furthermore the electrically conductive member can be improved in flexibility and bending resistance.

The number-average molecular weight of the polymer B may be measured by gel permeation chromatography using monodisperse polystyrenes having previously known molecular weights as a reference standard substance.

The acid value of the polymer B is preferably not less than 5 mgKOH/g, more preferably not less than 10 mgKOH/g and even more preferably not less than 15 mgKOH/g, and is also preferably not more than 200 mgKOH/g, more preferably not more than 100 mgKOH/g, even more preferably not more than 50 mgKOH/g and further even more preferably not more than 30 mgKOH/g.

The acid value of the polymer B may be measured by the same method as defined in JIS K 0070 except that only a mixed solvent of ethanol and an ether prescribed as a measuring solvent in JIS K 0070 was replaced with a mixed solvent containing acetone and toluene at a volume ratio [acetone:toluene] of 4:6.

The glass transition temperature of the polymer B is not higher than a temperature at which the electrically conductive images are formed, from the viewpoint of improving ordinary-temperature sintering properties of the metal fine particles as well as from the viewpoint of improving electrical conductivity and bending resistance of the resulting member. Specifically, the glass transition temperature of the polymer B is preferably not higher than 10° C., more preferably not higher than 0° C., even more preferably not higher than −10° C., further even more preferably not higher than −30° C. and still further even more preferably not higher than −50° C., and is also preferably not lower than −100° C., more preferably not lower than −90° C. and even more preferably not lower than −80° C.

The glass transition temperature of the polymer B may be measured by the method described in Examples below.

Incidentally, in the case where two or more kinds of polymers are used as the polymer B, if these polymers are compatible with each other, so that only one peak is observed in the characteristic curve prepared by the method described in Examples below, the glass transition temperature of the polymer B is measured on the basis of the peak. On the other hand, in the case where two or more kinds of polymers are used as the polymer B, if these polymers are incompatible with each other, so that two or more peaks are observed in the characteristic curve prepared by the method described in Examples below, the glass transition temperatures of the respective polymers constituting the polymer B are measured, and the glass transition temperature of the polymer B is determined as a weighed mean value of the glass transition temperatures of the respective polymers.

Examples of the configuration of the polymer B in the metal fine particle dispersion and the electrically conductive ink include the configuration in which the polymer B is adsorbed onto the respective metal fine particles (a), the configuration in which the metal fine particles (a) are incorporated in the polymer B, i.e., the metal fine particles (a) are enclosed (encapsulated) in the polymer B, and the configuration in which the polymer B is not adsorbed onto the respective metal fine particles (a). From the viewpoint of improving electrical conductivity and bending resistance of the resulting member, among these configurations, preferred is the configuration in which the metal fine particles (a) are incorporated in the polymer B, and more preferred is the metal fine particle-enclosing configuration in which the metal fine particles (a) are enclosed in the polymer B.

The mass ratio of the polymer B to a sum of the polymer B and the metal [polymer B/(polymer B+metal)] in the metal fine particle dispersion is preferably not less than 0.01, more preferably not less than 0.03 and even more preferably not less than 0.05, and is also preferably not more than 0.3, more preferably not more than 0.2 and even more preferably not more than 0.15, from the viewpoint of improving ordinary-temperature sintering properties of the metal fine particles as well as from the viewpoint of improving electrical conductivity and bending resistance of the resulting member.

The aforementioned mass ratio [polymer B/(polymer B+metal)] is calculated from masses of the polymer B and the metal which may be measured by the method described in Examples below using a differential thermogravimetric simultaneous measurement apparatus (TG/DTA).

The content of the metal in the electrically conductive ink is preferably not less than 1% by mass, more preferably not less than 3% by mass, even more preferably not less than 5% by mass and further even more preferably not less than 7% by mass from the viewpoint of improving electrical conductivity of the resulting member, and is also preferably not more than 30% by mass, more preferably not more than 25% by mass, even more preferably not more than 20% by mass and further even more preferably not more than 15% by mass from the viewpoint of improving bending resistance of the resulting member.

The content of the metal in the electrically conductive ink may be measured by the method described in Examples below.

The preferred numerical value range of the mass ratio of the polymer B to a sum of the polymer B and the metal [polymer B/(polymer B+metal)] in the electrically conductive ink is the same as the aforementioned preferred numerical value range of the mass ratio of the polymer B to a sum of the polymer B and the metal [polymer B/(polymer B+metal)] in the metal fine particle dispersion.

The mass ratio [polymer B/(polymer B+metal)] in the electrically conductive ink is calculated from masses of the polymer B and the metal which may be measured by the method described in Examples below using a differential thermogravimetric simultaneous measurement apparatus (TG/DTA), similar to the aforementioned mass ratio [polymer B/(polymer B+metal)] in the metal fine particle dispersion.

(Hydroxyketone)

The electrically conductive ink preferably contains a hydroxyketone from the viewpoint of improving electrical conductivity and bending resistance of the resulting member.

The hydroxyketone contains a carbonyl group and a hydroxy group in a molecule thereof, and is coordinated and adsorbed onto the metal fine particles by the action of these functional groups, so that the metal fine particles can be improved in dispersion stability owing to the chelate effect.

As the hydroxyketone, there may be mentioned α-hydroxyketones, β-hydroxyketones and the like. Specific examples of the hydroxyketone include monohydroxyacetone (1-hydroxy-2-propanone), 1-hydroxy-2-butanone, 3-hydroxy-2-butanone, 3-hydroxy-3-methyl-2-butanone, 1-hydroxy-2-pentanone, 3-hydroxy-2-pentanone, 2-hydroxy-3-pentanone, 4-hydroxy-4-methyl-2-pentanone, 3-hydroxy-2-hexanone, 2-hydroxy-3-hexanone, 4-hydroxy-3-hexanone, 4-hydroxy-3-heptanone, 3-hydroxy-4-heptanone, 5-hydroxy-4-octanone and the like. These hydroxyketones may be used alone or in combination of any two or more thereof.

Among these hydroxyketones, from the viewpoint of improving dispersion stability of the metal fine particles as well as from the viewpoint of improving electrical conductivity and bending resistance of the resulting member, preferred are α-hydroxyketones, and more preferred is monohydroxyacetone. The monohydroxyacetone exhibits low steric hindrance owing to a low molecular weight thereof. Therefore, it is considered that the monohydroxyacetone can be closely coordinated and adsorbed onto the surface of the respective metal fine particles. Furthermore, the monohydroxyacetone also contains a hydrophobic methyl group and a hydrophilic hydroxymethyl group on opposite sides of the carbonyl group and therefore is excellent in hydrophile-lipophile balance. Thus, the monohydroxyacetone can be adsorbed onto the surface of the respective metal fine particles, so that the metal fine particles can be improved in dispersion stability. On the other hand, when the electrically conductive ink is applied onto the porous substrate, the monohydroxyacetone tends to be rapidly volatilized even under ordinary-temperature environments owing to a low molecular weight thereof, and tends to be readily desorbed from the surface of the metal fine particles by transfer thereof into the substrate, etc. As a result, it is considered that since the metal fine particles undergo necking therebetween, the resulting member can exhibit high electrical conductivity and can be improved in bending resistance.

The content of the hydroxyketone in the electrically conductive ink is preferably not less than 0.05% by mass, more preferably not less than 0.1% by mass and even more preferably not less than 0.3% by mass, and is also preferably not more than 10% by mass, more preferably not more than 7% by mass, even more preferably not more than 5% by mass, further even more preferably not more than 3% by mass and still further even more preferably not more than 1% by mass, from the viewpoint of improving dispersion stability of the metal fine particles as well as from the viewpoint of improving electrical conductivity and bending resistance of the resulting member.

The mass ratio of the hydroxyketone to the metal [hydroxyketone/metal] in the electrically conductive ink is preferably not less than 0.005, more preferably not less than 0.01 and even more preferably not less than 0.03, and is also preferably not more than 5, more preferably not more than 3 and even more preferably not more than 1, from the viewpoint of improving dispersion stability of the metal fine particles.

The content of the hydroxyketone and the aforementioned mass ratio [hydroxyketone/metal] in the electrically conductive ink may be measured and calculated by the methods described in Examples below.

(Carboxylic Acid)

The electrically conductive ink preferably contains a mono- or polycarboxylic acid having not less than 1 and not more than 24 carbon atoms, more preferably a monocarboxylic acid having not less than 1 and not more than 24 carbon atoms (hereinafter also referred to merely as a "monocarboxylic acid"), from the viewpoint of improving dispersion stability of the metal fine particles. The aforementioned carboxylic acid may also contain a functional group other than a carboxy group. Examples of the functional group other than a carboxy group include functional groups that can be coordinated to the metal fine particles, such as a functional group containing a halogen atom, a functional group containing at least one hetero atom, such as a hydroxy group, a thiol group, etc., and the like.

The number of carbon atoms contained in the monocarboxylic acid is preferably not less than 1, and is also preferably not more than 20, more preferably not more than 16, even more preferably not more than 10, further even more preferably not more than 8 and still further even more preferably not more than 6.

The monocarboxylic acid is preferably in the form of a saturated aliphatic monocarboxylic acid from the viewpoint of improving dispersion stability of the metal fine particles as well as from the viewpoint of improving electrical conductivity and bending resistance of the resulting member.

Examples of the saturated aliphatic monocarboxylic acid include linear aliphatic carboxylic acids such as formic acid, acetic acid, propionic acid, butyric acid, valeric acid, caproic acid, caprylic acid, capric acid, lauric acid, palmitic acid, etc., and the like. Among these saturated aliphatic monocarboxylic acids, from the same viewpoint as described above, preferred is at least one acid selected from the group consisting of formic acid, acetic acid and propionic acid, more preferred is at least one acid selected from the group consisting of acetic acid and formic acid, and even more preferred is acetic acid.

The content of the monocarboxylic acid in the electrically conductive ink is preferably not less than 0.05% by mass, more preferably not less than 0.1% by mass and even more preferably not less than 0.3% by mass, and is also preferably not more than 10% by mass, more preferably not more than 7% by mass, even more preferably not more than 5% by mass, further even more preferably not more than 3% by mass and still further even more preferably not more than 1% by mass, from the viewpoint of improving dispersion stability of the metal fine particles as well as from the viewpoint of improving electrical conductivity and bending resistance of the resulting member.

The mass ratio of the monocarboxylic acid to the metal [monocarboxylic acid/metal] in the electrically conductive ink is preferably not less than 0.005, more preferably not less than 0.01, even more preferably not less than 0.02 and further even more preferably not less than 0.03, and is also preferably not more than 1.5, more preferably not more than 1, even more preferably not more than 0.5 and further even more preferably not more than 0.1, from the viewpoint of improving dispersion stability of the metal fine particles.

The content of the monocarboxylic acid and the aforementioned mass ratio [monocarboxylic acid/metal] in the electrically conductive ink may be measured and calculated by the methods described in Examples below.

(Water-Based Solvent)

The electrically conductive ink preferably contains a water-based solvent from the viewpoint of improving electrical conductivity and bending resistance of the resulting member.

The water-based solvent preferably contains water as a main component, and may further contain an organic solvent C. Examples of the organic solvent C include aliphatic alcohols having not less than 1 and not more than 4 carbon atoms, such as ethanol, 1-propanol, 2-propanol, propylene glycol, etc.; ketones having not less than 3 and not more than 8 carbon atoms other than the hydroxyketones, such as acetone, methyl ethyl ketone, etc.; ethers such as tetrahydrofuran, etc.; acetic acid alkyl ($C_1$ to $C_3$) esters such as ethyl acetate, propyl acetate, etc.; and the like.

The boiling point of the organic solvent C is preferably not lower than 40° C., more preferably not lower than 50° C. and even more preferably not lower than 60° C., and is also preferably not higher than 230° C., more preferably not higher than 200° C., even more preferably not higher than 150° C., further even more preferably not higher than 100° C., still further even more preferably not higher than 90° C. and furthermore preferably not higher than 80° C. In the case where two or more organic solvents are used as the organic solvent C, the boiling point of the organic solvent C is a weighted mean value of boiling points of the organic solvents which are weighted by contents (% by mass) of the respective organic solvents.

From the viewpoint of improving electrical conductivity and bending resistance of the resulting member, as the organic solvent C, preferred is at least one organic solvent selected from the group consisting of acetone, methyl ethyl ketone, tetrahydrofuran, ethyl acetate, 1-propanol and propylene glycol, and more preferred is propylene glycol.

The content of water in the water-based solvent is preferably not less than 50% by mass, more preferably not less than 60% by mass and even more preferably not less than 70% by mass, and is also preferably not more than 95% by mass, more preferably not more than 90% by mass and even more preferably not more than 85% by mass, from the viewpoint of improving environmental suitability.

The content of the organic solvent C in the electrically conductive ink is preferably not less than 3% by mass, more preferably not less than 7% by mass and even more preferably not less than 10% by mass, and is also preferably not more than 40% by mass, more preferably not more than 30% by mass and even more preferably not more than 20% by mass, from the viewpoint of improving electrical conductivity and bending resistance of the resulting member.

The mass ratio of the organic solvent C to the metal [organic solvent C/metal] in the electrically conductive ink is preferably not less than 0.1, more preferably not less than 0.5 and even more preferably not less than 1, and is also preferably not more than 5, more preferably not more than 3 and even more preferably not more than 2, from the viewpoint of improving electrical conductivity and bending resistance of the resulting member.

In the case where the electrically conductive ink contains propylene glycol, and the metal fine particle dispersion contains propylene glycol as a dispersing medium thereof, the propylene glycol contained in the metal fine particle dispersion may be directly used as the organic solvent C for the electrically conductive ink.

(Nitrate Ions)

The electrically conductive ink preferably contains substantially no counter ions of the metal ions therein from the viewpoint of improving electrical conductivity and bending resistance of the resulting member.

The expression "contains substantially no counter ions" as used herein means that the content of the counter ions in the electrically conductive ink is preferably not more than 10 ppm, more preferably not more than 5 ppm, even more preferably not more than 3 ppm, further even more preferably not more than 1 ppm and still further even more preferably 0 ppm.

If there tends to occur such a fear that nitrate ions derived from the metal raw material compound used upon production of the metal fine particle dispersion are included as counter ions in the electrically conductive ink, it is preferred that the electrically conductive ink contains substantially no nitrate ions.

The electrically conductive ink may also contain various additives that may be usually used in electrically conductive inks, such as a polymer dispersant other than the polymer B, a surfactant, a humectant, a wetting agent, a penetrant, a viscosity modifier, a defoaming agent, an antiseptic agent, a mildew-proof agent, a rust preventive, etc., if required, unless the aforementioned advantageous effects of the present invention are adversely affected by inclusion thereof.

(Properties of Electrically Conductive Ink)

The average particle size of the metal fine particles (a) in the electrically conductive ink is preferably the same as the average particle size of the metal fine particles (a) in the aforementioned metal fine particle dispersion, and the preferred range of the average particle size of the metal fine particles (a) in the electrically conductive ink is also the same as the preferred range of the average particle size of the metal fine particles (a) in the aforementioned metal fine particle dispersion.

The viscosity of the electrically conductive ink as measured at 32° C. is preferably not less than 2 mPa·s, more preferably not less than 3 mPa·s and even more preferably not less than 4 mPa·s, and is also preferably not more than 30 mPa·s, more preferably not more than 25 mPa·s and even more preferably not more than 20 mPa·s, from the viewpoint of improving electrical conductivity and bending resistance of the resulting member. The viscosity of the electrically conductive ink may be measured using an E-type viscometer.

The pH value of the electrically conductive ink as measured at 20° C. is preferably not less than 4.0, more preferably not less than 4.5 and even more preferably not less than 5.0 from the viewpoint of improving electrical conductivity and bending resistance of the resulting member, and is also preferably not more than 11, more preferably not more than 10 and even more preferably not more than 9.5 from the viewpoint of improving the resistance of members and suppressing skin irritation. The pH value of the electrically conductive ink may be measured by ordinary methods.

(Production of Electrically Conductive Ink)

The electrically conductive ink according to the present invention may be produced by preliminarily preparing the metal fine particle dispersion, and then mixing a hydroxyketone, a carboxylic acid, a water-based solvent, etc., therein according to requirements, followed by stirring the resulting mixture. The metal fine particle dispersion may be obtained by a method (i) of mixing a metal raw material compound A, the polymer B and a reducing agent with each other to subject the metal raw material compound A to reduction reaction, a method (ii) of adding a dispersing medium to metal fine particles preliminarily prepared by conventionally known methods, followed by mixing the resulting dispersion, and the like. Among these methods, from the viewpoint of improving dispersion stability of the metal fine particles, preferred is the method (i). By conducting the method (i), the metal raw material compound A is subjected to reduction reaction by the reducing agent so as to form the metal fine particles (a) which are dispersed with the polymer B.

In the method (i), the metal raw material compound A, the polymer B and the reducing agent may be mixed with each other by conventionally known methods, in which the order of mixing of the respective components is not particularly limited.

When mixing the respective components in the method (i), the aforementioned water-based solvent may be further used therein. In the case of using the water-based solvent, the water-based solvent may also be used as a dispersing medium for the resulting metal fine particle dispersion.

The temperature used upon conducting the reduction reaction is preferably not lower than 10° C., more preferably not lower than 20° C. and even more preferably not lower than 30° C., and is also preferably not higher than 70° C., more preferably not higher than 60° C. and even more preferably not higher than 50° C. The reduction reaction may be conducted either in atmospheric air or in an atmosphere of an inert gas such as nitrogen gas, etc.

[Metal Raw Material Compound A]

The metal raw material compound A is not particularly limited as long as it is a compound containing the aforementioned metal. Examples of the metal raw material compound A include metal salts of inorganic acids or organic acids, metal oxides, metal hydroxides, metal sulfides, metal halides and the like. Specific examples of the aforementioned metal salts include metal salts of inorganic acids, such as nitric acid salts, nitrous acid salts, sulfuric acid salts, carbonic acid salts, ammonium salts, perchloric acid salts, etc.; metal salts of organic acids, such as acetic acid salts, etc.; and the like. These metal raw material compounds A may be used alone or in the form of a mixture of any two or more thereof.

Among these metal raw material compounds A, preferred is at least one compound selected from the group consisting of metal salts of inorganic acids or organic acids, and metal oxides, more preferred is at least one compound selected from the group consisting of metal salts of nitric acid, and metal oxides, and even more preferred are metal oxides.

In the case where the metal raw material compound A is in the form of a metal oxide, no counter ions of the metal ion are contained as impurities in the resulting dispersion, so that it is possible to obtain the metal fine particle dispersion without need of subjecting the dispersion to purification treatment such as dialysis, etc.

As the metal oxides, preferred are oxides of transition metals belonging to Groups 4 to 11 in the 4th to 6th Periods of the Periodic Table, more preferred are oxides of copper, or noble metals such as gold, silver, platinum, palladium, etc., even more preferred is an oxide of at least one metal selected from the group consisting of gold, silver, copper and palladium, further even more preferred is at least one oxide selected from the group consisting of gold oxide, silver oxide and copper oxide, and still further even more preferred is silver oxide.

[Reducing Agent]

The reducing agent used herein is not particularly limited, and may be either an inorganic reducing agent or an organic reducing agent.

Examples of the organic reducing agent include alcohols such as ethylene glycol, propylene glycol, etc.; aldehydes such as formaldehyde, acetaldehyde, propionaldehyde, etc.; acids such as ascorbic acid, citric acid, etc., and salts thereof; aliphatic amines, e.g., alkanolamines such as ethanolamine, N-methyl ethanolamine, N,N-dimethyl ethanolamine (2-(dimethylamino)ethanol), N,N-diethyl ethanolamine, diethanolamine, N-methyl diethanolamine, triethanolamine, propanolamine, NN-dimethyl propanolamine, butanolamine, hexanolamine, etc., alkyl amines such as propylamine, butylamine, hexylamine, diethylamine, dipropylamine, dimethylethylamine, diethylmethylamine, triethylamine, etc., (poly)alkylene polyamines such as ethylenediamine, triethylenediamine, tetramethyl ethylenediamine, diethylenetriamine, dipropylenetriamine, triethylenetetramine, tetraethylenepentamine, etc., and the like; alicyclic amines such as piperidine, pyrrolidine, N-methyl pyrrolidine, morpholine, etc.; aromatic amines such as aniline, N-methyl aniline, toluidine, anisidine, pheneticline, etc.; aralkyl amines such as benzylamine, N-methyl benzylamine, etc.; and the like.

Examples of the inorganic reducing agent include boron hydride salts such as sodium boron hydride, ammonium boron hydride, etc.; aluminum hydride salts such as lithium aluminum hydride, potassium aluminum hydride, etc.; hydrazines such as hydrazine, hydrazine carbonate, etc.; hydrogen gas; and the like.

Incidentally, these reducing agents may be used alone or in combination of any two or more thereof.

The reducing agent is preferably the organic reducing agent, more preferably at least one compound selected from the group consisting of alcohols and amines, even more preferably at least one compound selected from the group consisting of ethylene glycol, propylene glycol and an alkanol amine having not less than 2 and not more than 6 carbon atoms, and further even more preferably at least one compound selected from the group consisting of propylene glycol and N,N-dimethyl ethanolamine.

In the case where the propylene glycol is used as the reducing agent, the propylene glycol is oxidized upon the reduction reaction to thereby produce monohydroxyacetone. Therefore, by suitably adjusting the conditions of the reduction reaction, it is possible to control contents of the monohydroxyacetone and the propylene glycol in the metal fine particle dispersion. In addition, since the propylene glycol also has a function as a dispersing medium for the metal fine particle dispersion, no step of separately adding an additional dispersing medium to the metal fine particle dispersion is required, which is preferable from the standpoint of facilitated production of the metal fine particle dispersion. Moreover, in the embodiment in which the metal fine particle dispersion further contains the monocarboxylic acid, by adjusting the conditions of the reduction reactions by using the propylene glycol as the reducing agent, the aforementioned monohydroxyacetone is further oxidized upon the reduction reaction to thereby produce acetic acid. Therefore, in such a case, no step of separately adding an additional monocarboxylic acid to the metal fine particle dispersion is required, which is also preferable from the standpoint of facilitated production of the metal fine particle dispersion.

In the present invention, from the viewpoint of removing impurities such as the unreacted reducing agent, a surplus of the polymer B which has no contribution to dispersion of the metal fine particles, etc., the resulting metal fine particle dispersion may be further subjected to purification step in the method (i).

The method of purifying the metal fine particle dispersion is not particularly limited, and there may be used various methods including membrane treatments such as dialysis, ultrafiltration, etc.; centrifugal separation treatments; and the like. Among these methods, from the viewpoint of efficiently removing the impurities from the resulting dispersion, preferred are the membrane treatments, and more preferred is dialysis. As a material of a dialysis membrane used in the dialysis, there is preferably used a regenerated cellulose.

The molecular weight cutoff of the dialysis membrane is preferably not less than 1,000, more preferably not less than 5,000 and even more preferably not less than 10,000, and is also preferably not more than 100,000 and more preferably not more than 70,000, from the viewpoint of efficiently removing the impurities from the resulting dispersion.

(Production of Electrically Conductive Member)

The method for producing an electrically conductive member according to the present invention includes the step of applying the electrically conductive ink to a substrate to form electrically conductive images on the substrate under ordinary-temperature environments, thereby obtaining the electrically conductive member, from the viewpoint of improving ordinary-temperature sintering properties of the metal fine particles as well as from the viewpoint of improving electrical conductivity and bending resistance of the resulting member. In the present invention, the metal fine particle dispersion may also be directly applied as the electrically conductive ink to the substrate.

The temperature used upon forming the electrically conductive images is in the aforementioned ordinary temperature range (i.e., in the range of not lower than 5° C. and not higher than 45° C.), more specifically, is preferably not lower than 10° C., more preferably not lower than 15° C. and even more preferably not lower than 20° C., and is also preferably not higher than 40° C., more preferably not higher than 35° C. and even more preferably not higher than 30° C., from the viewpoint of improving electrical conductivity and bending resistance of the resulting member.

<Substrate>

The substrate used in the present invention has a porous surface. The average pore size of the porous surface of the substrate is preferably not less than 10 nm, more preferably not less than 20 nm and even more preferably not less than 30 nm, and is also preferably not more than 200 nm, more preferably not more than 150 nm and even more preferably not more than 100 nm, from the viewpoint of improving ordinary-temperature sintering properties of the metal fine particles as well as from the viewpoint of improving electrical conductivity and bending resistance of the resulting member. The average pore size of the porous surface of the substrate may be measured by the method described in Examples below.

As the substrate, there may be mentioned porous substrates that are formed of various polymers such as cellulose, polytetrafluoroethylene, oriented polytetrafluoroethylene, polyolefin, polyester, polyamide, polyether, polysulfone, polyethersulfone, polyvinylidene fluoride, polyvinyl chloride, polystyrene, polyethylene, polypropylene, polyacrylonitrile, a (meth)acrylic polymer, polyurethane, etc.; various glass materials; various ceramic materials; or a combination of these materials.

The substrate may be used in the form of a coated paper, a glossy paper, a plain paper, a glossy film, etc.

The aforementioned substrate may be of any type as long as it has at least a porous surface. However, from the viewpoint of improving ordinary-temperature sintering properties of the metal fine particles as well as from the viewpoint of improving electrical conductivity and bending resistance of the resulting member, it is preferred that the aforementioned substrate is such a substrate on the surface of which a fine particle-containing layer as a porous layer of a void type is formed (hereinafter also referred to merely as a "void-type substrate").

The void-type substrate may be produced by forming the fine particle-containing layer formed of fine particles and a water-soluble polymer (binder) on a surface of a support body. With the substrate including such a fine particle-containing layer, the polymer B and the dispersing medium are absorbed into the voids between the fine particles by a capillary force owing to the voids, so that it is possible to develop ordinary-temperature sintering properties of the metal fine particles as well as high electrical conductivity and bending resistance of the resulting member.

Examples of the aforementioned fine particles include inorganic fine particles and organic fine particles. Among these fine particles, preferred are at least one kind of inorganic fine particles selected from the group consisting of silica and alumina, and more preferred are at least one kind of porous inorganic fine particles selected from the group consisting of silica and alumina.

As the aforementioned water-soluble polymer (binder), there may be mentioned polyvinyl alcohol and the like.

As the support body of the void-type substrate, preferred are those including a paper, a resin film and a composite thereof, etc., and from the viewpoint of improving versatility of the substrate, more preferred is a paper. That is, the substrate used in the present invention is preferably a substrate including the support body and an inorganic fine particle-containing layer formed on the surface of the support body, and more preferably a substrate including a paper support body and an inorganic fine particle-containing layer formed on the surface of the paper support body, from the viewpoint of improving ordinary-temperature sintering properties of the metal fine particles as well as from the viewpoint of improving electrical conductivity and bending resistance of the resulting member.

The substrate used in the present invention preferably has high surface smoothness from the viewpoint of improving electrical conductivity of the resulting member. The surface smoothness of the substrate can be expressed by a 8° gloss value on the surface of the substrate as an index therefor. From the same viewpoint as described above, the 8° gloss value on the surface of the substrate is preferably not less than 20, and is also preferably not more than 50, more preferably not more than 40 and even more preferably not more than 30.

The 8° gloss value on the surface of the substrate may be measured by the method described in Examples below.

As the substrate according to the present invention, there may be used commercially available ink-jet papers exclusively used for ink-jet printing. As such a substrate, there may be mentioned "Photographic Paper <Glossy> Model No.: KA4100PSKR" (tradename) available from Seiko Epson Corporation.

The method of applying the electrically conductive ink is not particularly limited. Examples of the method of applying the electrically conductive ink include ink-jet printing, screen printing, flexographic printing, gravure printing, offset printing, dispenser printing, slot die coating, clip coating, spray coating, spin coating, doctor blading, knife edge coating, bar coating, and the like. Among these methods, from the viewpoint of improving electrical conductivity and bending resistance of the resulting member, preferred is an ink-jet printing method.

In the case where the method of applying the electrically conductive ink is the ink-jet printing method, the electrically conductive ink may be loaded to an ink-jet printing apparatus from which droplets of the ink are ejected onto the substrate to form the electrically conductive images on the substrate. The ink-jet printing apparatus may be of either a thermal type or a piezoelectric type. Among these apparatuses, preferred is an ink-jet printing apparatus of a piezoelectric type.

The temperature of the ink-jet print head is not particularly limited as long as the temperature falls with the range in which the electrically conductive images can be formed on the substrate. From the viewpoint of improving electrical conductivity and bending resistance of the resulting member, the temperature of the ink-jet print head is preferably not lower than 15° C., more preferably not lower than 20° C. and even more preferably not lower than 25° C., and is also preferably not higher than 45° C., more preferably not higher than 40° C. and even more preferably not higher than 35° C.

The head voltage applied to the ink-jet print head is preferably not less than 5 V, more preferably not less than 10 V and even more preferably not less than 15 V, and is also preferably not more than 40 V, more preferably not more than 35 V and even more preferably not more than 30 V, from the viewpoint of improving printing efficiency, etc.

The drive frequency of the print head is preferably not less than 1 kHz, more preferably not less than 5 kHz and even more preferably not less than 10 kHz, and is also preferably not more than 50 kHz, more preferably not more than 40 kHz and even more preferably not more than 35 kHz, from the viewpoint of improving printing efficiency, etc.

The amount of droplets of the electrically conductive ink ejected is preferably not less than 5 pL and more preferably not less than 10 pL, and is also preferably not more than 30 pL and more preferably not more than 20 pL, as calculated per one ink droplet ejected, from the viewpoint of maintaining accuracy of impact positions of the ink droplets as well as from the viewpoint of improving electrical conductivity and bending resistance of the resulting member.

The amount of the electrically conductive ink applied onto the substrate in terms of a solid content thereof is preferably not less than 0.5 g/m², more preferably not less than 1 g/m² and even more preferably not less than 2 g/m², and is also preferably not more than 20 g/m², more preferably not more than 15 g/m² and even more preferably not more than 10 g/m².

The resolution is preferably not less than 200 dpi and more preferably not less than 300 dpi, and is also preferably not more than 1,000 dpi, more preferably not more than 800 dpi and even more preferably not more than 600 dpi. Meanwhile, the term "resolution" as used in the present specification means the number of dots per 1 inch (2.54 cm) which are formed on the substrate. For example, the "resolution of 600 dpi" means that when the ink droplets are ejected onto the substrate using a line print head on which a nozzle row is arranged such that the number of nozzle ports per a length of the nozzle row corresponds to 600 dpi (dots/inch), a corresponding dot row of 600 dpi is formed in the direction perpendicular to a transporting direction of the substrate, and further when ejecting the ink droplets while moving the substrate in the transporting direction thereof, the dot row of 600 dpi is also formed on the substrate along the transporting direction thereof. In the present specification, it is assumed that the value of the resolution in the direction perpendicular to the transporting direction of the substrate is the same as the value of the resolution in the transporting direction of the substrate.

From the viewpoint of rapidly developing the electrically conductive images, the production method of the present invention may further include, after applying the electrically conductive ink to the substrate under ordinary-temperature environments, the drying step of drying a coating film of the ink on the substrate at a temperature equal to the ink-applying temperature or a temperature that falls within an ordinary temperature range but is higher than the ink-applying temperature. However, from the viewpoint of enhancing productivity of the electrically conductive member, it is preferred that the production method of the present invention includes no drying step.

(Electrically Conductive Member)

The contact angle of water on the electrically conductive images formed on the electrically conductive member is preferably not less than 70°, more preferably not less than 80°, even more preferably not less than 90°, further even more preferably not less than 95° and still further even more preferably not less than 100°, from the viewpoint of improving adhesion properties of the electrically conductive member to the other constitutional members, etc. The contact angle of water on the electrically conductive images may be measured by the method described in Examples below.

The film thickness of the electrically conductive images is preferably not less than 0.1 µm, more preferably not less than 0.2 µm and even more preferably not less than 0.5 µm, and is also preferably not more than 5 µm, more preferably not more than 4 µm and even more preferably not more than 3 µm.

The volume resistivity pv of the electrically conductive images is preferably not more than $5 \times 10^{-5}$ Ω·cm, more preferably not more than $4.5 \times 10^{-5}$ Ω·cm, even more preferably not more than $4.0 \times 10^{-5}$ Ω·cm, further even more preferably not more than $3.5 \times 10^{-5}$ Ω·cm and still further even more preferably not more than $3.0 \times 10^{-5}$ Ω·cm.

The volume resistivity pv of the electrically conductive images may be measured by the method described in Examples below.

The method of the present invention is capable of attaining ordinary-temperature sintering properties of the metal fine particles as well as excellent electrical conductivity and bending resistance of the electrically conductive member, and therefore is useful for formation of wiring cables, electrodes or the like used in various application fields. Examples of the applications of the electrically conductive member include RFID (radio frequency identifier) tags; capacitors such as MLCC (multi-layer ceramic capacitor), etc.; electronic paper materials; image display devices such as liquid crystal displays, organic EL displays, etc.; organic EL elements; organic transistors; wiring boards such as printed wiring boards, flexible wiring boards, etc.; organic solar cells; sensors such as flexible sensors, etc.; bonding agents such as solders, etc.; and the like.

EXAMPLES

In the following Prepartion Examples, Prodcution Examples, Examples and Comparative Examples, the "part(s)" and "%" indicate "part(s) by mass" and "% by mass", respectively, unless otherwise specified.

(1) Measurement of Glass Transition Temperature (Tg) of Polymer B

The polymer B was dried under a reduced pressure of 8 kPa at 100° C. for 24 hours using a vacuum dryer "Model: DP-33" available from Yamato Scientific Co., Ltd. Using a differential scanning calorimeter "Model: Q-200" available from TA Instruments Japan Inc., the thus dried polymer B as a sample to be measured was weighed in an amount of 0.01 to 0.02 g in an aluminum pan, heated to 200° C. and then cooled from 200° C. to −80° C. at a temperature drop rate of 10° C./minute. Then, the sample was heated again to 150° C. at a temperature rise rate of 10° C./minute to measure and prepare an endothermic curve thereof. The temperature at which an extension of a baseline below an endothermic maximum peak temperature in the curve was intersected with a tangential line having a maximum inclination of the curve in the range of from a rise-up portion of the peak to an apex of the peak was read as a glass transition temperature of the polymer B.

(2) Measurement of Content of Metal and Content of Polymer B in Metal Fine Particle Dispersion or Electrically Conductive Ink Using a differential thermogravimetric simultaneous measurement apparatus (TG/DTA) "STA7200RV" (tradename) available from Hitachi High-Tech Science Corporation, 10 mg of the metal fine particle dispersion or the electrically conductive ink as a sample to be measured was weighed in an aluminum pan cell, and heated from 35° C. to 550° C. at a temperature rise rate of 10° C./min to measure a reduced mass of the sample under an air flow of 50 mL/min.

The reduced mass of the sample as measured in a temperature range of from 35° C. to 230° C. was defined as a mass of the dispersing medium, the reduced mass of the sample as measured in a temperature range of from 230° C. to 550° C. was defined as a mass of the polymer B, and a mass of the residue at 550° C. was defined as a mass of the metal, to calculate a content (%) of the metal and a content (%) of the polymer B in the metal fine particle dispersion or the electrically conductive ink.

(3-1) Qualitative Analysis of Respective Components in Metal Fine Particle Dispersion or Electrically Conductive Ink The qualitative analysis of the respective components in the metal fine particle dispersion or the electrically conductive ink was carried out using a gas chromatograph (GC). The measuring conditions used in the analysis are as follows.

GC: "Agilent Technology 6890N Network GC" available from Agilent Technologies, Inc.

Hydrogen generator: "HG26S" available from GL Sciences Inc.

GC temperature conditions: After maintaining a sample to be measured at 40° C. for 5 minutes, the sample was heated from 40° C. to 240° C. at a temperature rise rate of 10° C./min, and maintained at 240° C. for 5 minutes.

Sample to be measured: Using a material prepared by mixing 0.1 g of the metal fine particle dispersion or the electrically conductive ink with 9.9 g of acetone, stirring the resulting mixture at 25° C. for 10 hours with a magnetic stirrer, and then subjecting the mixture to filtration treatment through a syringe filter "DISMIC-13HP" (PTFE; 0.2 μm) available from Advantec Co., Ltd.

Detection times for standard samples: 10.03 min for monohydroxyacetone; 11.47 min for acetic acid; 2.48 min for acetone.

(3-2) Meaurement of Contents of Respective Components in Metal Fine Particle Dispersion or Electrically Conductive Ink The contents of respective components including monohydroxyacetne, propylene glycol, a low-molecular weight carboxylic acid, ete., in the metal fine particle dispersion or the electrically conductive ink were quantitativbely determined by the following method using $^1$H-NMR.

(Measuring Conditions)

Measuring device: "FT-NMR Mercury-400" available from Varian, Inc.

Nucleus measured: $^1$H

Sample to be measured: Using a mixture prepared by mixing 0.2 g of the metal fine particle dispersion with 1.0 g of the below-mentioned heavy water containing an internal standard.

Magnetic field strength: 14.09637 [T]

Frequency of scanning: 16 times

Measuring temperature: 30° C.

Relaxation time: 45 sec (Preparation of Heavy Water Containing Internal Standard)

TSP (sodium 3-(trimethylsilyl)propionate-2,2,3,3-d4) was weighed in an amount of 0.1 g in a 100 mL measuring flask, and then heavy water was added to the measuring flask until the contents of the measuring flask reached 100 mL. The contents of the measuring flask were allowed to stand overnight to completely dissolve solid components therein, thereby preparing heavy water containing TSP as an internal standard.

(Quantitative Determination of Contents of Respective Components in Metal Fine Particle Dispersion or Electrically Conductive Ink)

The contents of the respective components in the metal fine particle dispersion or the electrically conductive ink were quantitatively determined from integrated values of proton signals of the respective components on the basis of the obtained $^1$H-NMR spectrum. The quantitative determination was carried out using the integrated value of δ 4.1 ppm (for methylene protons of monohydroxyacetone), the integrated value of δ 1.1 ppm (for methyl protons of propylene glycol), and the integrated value of δ 1.8 ppm (for acetyl protons of acetic acid) assuming that TSP was δ 0 ppm.

(4) Quantitative Determination of Nitrate Ions

A 100 mL polyethylene beaker was charged with 1 g of the electrically conductive ink, and then ion-exchanged water was added to the beaker to adjust a total amount of the contents of the beaker to 100 g. Thereafter, the contents of the beaker were stirred with a magnetic stirrer for 10 minutes at an ordinary temperature (25° C.; in the following Examples, etc., the ordinary temperature indicates 25° C.). The resulting solution was subjected to quantitative determination of nitrate ions therein using a bench-top ion meter "Model; F-72" available from Horiba Ltd., equipped with a nitrate ion electrode "Model; 8201-10C" available from Horiba Ltd., and a reference electrode "Model; 2562A-10T" available from Horiba Ltd.

(5) Measurement of Average Particle Size of Metal Fine Particles (a)

The metal fine particle dispersion or the electrically conductive ink was diluted with ion-exchanged water so as to control a content of the metal therein to 0.1% by mass. The resulting dilute solution was applied to a hydrophilized carbon support film "ELASTIC CARBON ELS-C10 STEM Cu 100P grid specification" (tradename) available from Okenshoji Co., Ltd., and naturally dried in air. The thus air-dried film was observed by a field emission-type scanning electron microscope (FE-SEM) "S-4800" available from Hitachi Limited under the conditions of STEM mode and an accelerated voltage of 30 KV to obtain a transmission image thereof. The thus photographed STEM image was treated by an image analyzing software "A-Zo-Kun" available from Asahi Kasei Engineering Corporation to calculate an "equivalent circle diameter" of each of 200 particles therein which was defined as a particle size of the respective particles.

The numeral values of an upper 5% and a lower 5% of the thus calculated particle sizes of the 200 particles were removed therefrom to determine an average value of the remaining 90% thereof. The thus determined average value was defined as an average particle size of the metal fine particles (a).

(6) Measurement of Average Pore Size of Porous Surface of Substrate

The surface of the substrate was observed by a field emission-type scanning electron microscope (FE-SEM) "S-4800" available from Hitachi Limited under the conditions of SEM mode and an accelerated voltage of 10 KV to microphotograph a surface SEM image thereof. The thus obtained SEM image was analyzed by an image analyzing software "Image J" available from The National Institutes of Health to treat a region of 1 μm$^2$ of the image and thereby calculate an "equivalent circle diameter" of respective pores present thereon which was defined as a pore size of the respective pores. The numeral values of an upper 5% and a lower 5% of the thus calculated pore sizes were removed therefrom to determine an average value of the remaining 90% thereof. The thus determined average value was defined as an average pore size of the porous surface of the substrate.

(7) Measurement of 8° Gloss Value of Surface of Substrate

The surface of the substrate before being subjected to printing which was used for production of the electrically conductive member was measured for a 8° glass value thereof using a spectrophotometer "Model: CM-700d" available from Konica Minolta Inc.

(8) Measurement of Contact Angle of Water on Electrically Conductive Images

Using an automatic microscopic contact angle meter "MCA-1" (tradename) available from Kyowa Interface Science Co., Ltd., 1 nL of ion-exchanged water was ejected onto the electrically conductive images from a capillary having an inner diameter of 30 μm whose outlet port was located at a position spaced by 120 μm apart from the surface of the electrically conductive images, and a contact angle of the ion-exchanged water on the electrically conductive images was measured (measuring temperature: 25° C.) after one second from ejection of the ion-exchanged water.

<Preparation of Metal Fine Particle Dispersion>

Preparation Example 1

A 1 L glass spinner flask (PYREX) with side arms was charged with 40 g of an aqueous solution (having a solid content of 40% by mass) of a styrene/α-methyl styrene/acrylic acid/maleic acid/alkoxy (polyethylene glycol/polypropylene glycol) acrylate (number of alkyleneoxide units: 32 mol; molar ratio [EP/PO]=75/25) copolymer "DISPERBYK-2015" (tradename) available from BYK Chemie GmbH (hereinafter also referred to merely as "BYK-2015") as the polymer B and 240 g of propylene glycol (guaranteed reagent; hereinafter also referred to merely as "PG") available from FUJIFILM Wako Pure Chemical Corporation as the reducing agent, and the contents of the flask were stirred with a magnetic stirrer at an ordinary temperature for 0.5 hour. Thereafter, while stirring the contents of the flask with the magnetic stirrer, 200 g of silver oxide (guaranteed reagent) available from FUJIFILM Wako Pure Chemical Corporation as the metal raw material compound A was charged into the flask, followed by further stirring the contents of the flask for 0.5 hour. Then, the flask was dipped in a water bath at 40° C. After the inside temperature of the flask reached 40° C., the contents of the flask were stirred for 2 hours, and then air-cooled, thereby obtaining a dark brown liquid.

The thus obtained dark brown liquid was charged into a 100 mL-capacity angle rotor, and subjected to centrifugal separation using a high-speed cooling centrifuge "himaCR22G" (tradename; temperature set: 20° C.) available from Koki Holdings Co., Ltd., at 3,000 rpm for 20 minutes. Thereafter, the liquid layer portion thus separated from the liquid was subjected to filtration treatment using a 25 mL-capacity needleless syringe available from Terumo Corporation fitted with a 5 μm-pore size membrane filter "Minisart" (tradename) available from Sartorius Inc., thereby obtaining a silver fine particle dispersion 1.

Preparation Example 2

The same procedure as in Preparation Example 1 was repeated except that "BYK-2015" was replaced with 16 g of dextrin hydrate (guaranteed reagent) available from FUJIFILM Wako Pure Chemical. Corporation, thereby obtaining a silver fine particle dispersion 2.

Preparation Example 3

A 1 L glass spinner flask (PYREX) was charged with 144 g of silver nitrate as the metal raw material compound A, 20 g of "BYK-2015" (in the form of an aqueous solution having a solid content of 40% by mass) as the polymer B and 130 g of ion-exchanged water, and the contents of the flask were stirred with a magnetic stirrer at an ordinary temperature until they became transparent when observed visually, thereby obtaining a mixed solution.

Next, 226 g of NN-dimethyl ethanolamine (hereinafter also referred to merely as "DMAE") as the reducing agent was charged into a 500 mL dropping funnel, and then the DMAE was added dropwise to the aforementioned mixed solution whose temperature was controlled in a water bath at 40° C., over 30 minutes. Thereafter, the resulting reaction solution was stirred for 5 hours while controlling the temperature of the reaction solution in a water bath at 40° C., and then air-cooled, thereby obtaining a dark brown liquid.

The thus obtained dark brown liquid was charged into a dialysis tube "Spectra/Por 6" (tradename; dialysis membrane: regenerated cellulose; molecular weight cutoff (MWCO)=50 K) available from Spectrum Laboratories Inc., and the dialysis tube was hermetically sealed with closers at opposite upper and lower ends thereof. The thus closed dialysis tube was dipped in 40 L of ion-exchanged water filled in a 50 L stainless steel beaker, and then the liquid was stirred for 1 hour while maintaining a temperature of the ion-exchanged water in the range of 20 to 25° C. Thereafter, the whole amount of the ion-exchanged water was replaced with new one every one hour, and after the replacement procedure was repeated three times, the resulting dispersion was stirred for 24 hours to complete the dialysis treatment, thereby obtaining a purified silver fine particle dispersion.

The thus obtained silver fine particle dispersion was concentrated under reduced pressure so as to control a concentration of silver therein to 35%, thereby obtaining a silver fine particle dispersion 3.

Preparation Example 4

The same procedure as in Preparation Example 1 was repeated except that "BYK-2015" was replaced with 16 g of succinic acid (guaranteed reagent) available from FT JIFILM Wako Pure Chemical Corporation, thereby obtaining a silver fine particle dispersion 4.

With respect to the respective metal fine particle dispersions obtained in the aforementioned Preparation Examples, the yield of the metal fine particles (a) therein was measured by the below-mentioned method. In addition, the contents of the respective components in the respective metal fine particle dispersions as well as the average particle size of the metal fine particles (a) therein were also measured by the aforementioned methods. The results are shown in Table 1.

[Measurement of Yield of Metal Fine Particles (a)]

A 1 L polyethylene beaker was charged with 10 g of the resulting metal fine particle dispersion and 500 g of ion-exchanged water, and the contents of the beaker were stirred with a magnetic stirrer at an ordinary temperature for 10 minutes. Thereafter, the resulting dispersion was allowed to stand at an ordinary temperature for 2 hours, and then subjected to decantation to remove a supernatant solution therefrom. Next, 500 g of ion-exchanged water was charged into the beaker, and the contents of the beaker were stirred with a magnetic stirrer at an ordinary temperature for 10 minutes. Thereafter, the resulting dispersion was allowed to stand at an ordinary temperature for 2 hours, and then subjected again to decantation to remove a supernatant solution therefrom. Then, the resulting precipitate was dried under a reduced pressure of 8 kPa at 100° C. for 24 hours using the aforementioned vacuum dryer "DP-33", thereby obtaining a dry precipitated component. The yield of the metal fine particles (a) (ratio of the metal fine particles (a) remaining unprecipitated under the aforementioned conditions) was calculated according to the following formula.

Yield (%) of metal fine particles (a)=100×[1−(mass (g) of dry precipitated component/mass (g) of metal contained in 10 g of resulting metal fine particle dispersion)]

TABLE 1-1

| | | Preparation Examples | | | |
|---|---|---|---|---|---|
| | | 1 | 2 | 3 | 4 |
| Kind of metal fine particle dispersion | | Silver fine particle dispersion 1 | Silver fine particle dispersion 2 | Silver fine particle dispersion 3 | Silver fine particle dispersion 4 |
| Metal raw material compound A | Kind | Silver oxide | Silver oxide | Silver nitrate | Silver oxide |
| | Amount compounded (g) | 200 | 200 | 144 | 200 |
| Polymer B | Kind | BYK-2015 | (Dextrin) | BYK-2015 | (Succinic acid) |
| | Tg (° C.) | −68 | 100 | −68 | No Tg detected |
| | Amount compounded (g) | 40 | 16 | 20 | 16 |
| Reducing agent | Kind | PG | PG | DMAE | PG |
| | Amount compounded (g) | 240 | 240 | 226 | 240 |
| Water-based solvent | Kind | — | — | Ion-exchanged water | — |
| | Amount compounded (g) | — | — | 130 | — |
| Reaction temperature | ° C. | 40 | 40 | 40 | 40 |
| Yield of metal fine particles (a) | % by mass (as silver) | 97 | 71 | 95 | 72 |

TABLE 1-2

| | | Preparation Examples | | | |
|---|---|---|---|---|---|
| | | 1 | 2 | 3 | 4 |
| Contents (% by mass) of respective components in metal fine particle dispersion | Metal (silver) | 37.4 | 35.4 | 35.0 | 37.7 |
| | Polymer B | 3.6 | 3.6 | 3.5 | 3.3 |
| | Monohydroxy-acetone | 2.7 | 1.9 | 0.0 | 2.3 |
| | Acetic acid | 1.7 | 1.2 | 0.0 | 1.6 |
| | PG | 54.6 | 57.9 | 0.0 | 55.1 |
| | Ion-exchanged water | — | — | 61.5 | — |
| | Total | 100.0 | 100.0 | 100.0 | 100.0 |
| Mass ratio [polymer B/(polymer B + metal)] | | 0.09 | 0.09 | 0.09 | 0.08 |
| Average particle size (nm) of metal fine particles (a) in metal fine particle dispersion | | 25 | 33 | 27 | 36 |

<Production of Electrically Conductive Ink>

Production Example 1 (Ink 1)

A 100 mL polyethylene screw vial was charged with 20 g of the silver fine particle dispersion 1 (silver content: 37.4%). Next, 54.8 g of ion-exchanged water was charged into the screw vial, and the contents of the screw vial were stirred with a magnetic stirrer at an ordinary temperature for 0.5 hour, thereby obtaining an ink 1 having a composition shown in Table 2.

Production Examples 2 to 7 (Inks 2 to 7)

The same procedure as in Production Example 1 was repeated except that the silver fine particle dispersion 1 was replaced with the respective silver fine particle dispersions shown in Table 2, and the amount of monohydroxyacetone, acetic acid or ion-exchanged water was changed as shown in Table 2 so as to suitably adjust a composition of an ink to be produced, thereby obtaining respective inks.

<Production of Electrically Conductive Member by Ink-Jet Printing Method>

Example 1

Under the environmental conditions of a temperature of 25±1° C. and a relative humidity of 30±5% RH, the ink 1 was loaded into an ink-jet print evaluation apparatus available from Trytech Co., Ltd., equipped with an ink-jet print head "KJ4B-QA06NTB-STDV" (piezoelectric type; number of nozzles: 2,656) available from Kyocera Corporation. The printing conditions were set to a head applied voltage of 26 V, a frequency of 20 kHz, an ejected ink droplet amount of 18 pL, a head temperature of 32° C., a resolution of 600 dpi, the number of ink shots for flushing before being ejected of 200 shots and a negative pressure of −4.0 kPa, and a substrate was fixed on a transportation table under reduced pressure such that a longitudinal direction of the substrate was aligned with a transportation direction thereof. Under the same temperature and humidity environmental conditions as described above, a printing command was transmitted to the aforementioned print evaluation apparatus to conduct printing by a single pass mode at Duty 100%, thereby obtaining an electrically conductive member 1.

As the substrate, there was used a commercially available photographic glossy paper for ink-jet printing "Photographic Paper <Glossy>, Model No.: KA4100PSKR" (tradename) available from Seiko Epson Corporation.

Examples 2 To 5, Comparative Examples 1-1 and 1-2 and Comparative Example 2

The same procedure as in Example 1 was repeated except for using the respective inks shown in Table 2, thereby obtaining respective electrically conductive members.

Meanwhile, in Comparative Example 1-1, after conducting the printing under the same conditions as used in Example 1, the electrically conductive member 1-1 obtained by heating the member at 120° C. for 1 hour using a vacuum dryer "Model: DVS402" available from Yamato Scientific Co., Ltd., was subjected to respective evaluation procedures.

The respective electrically conductive members obtained in the aforementioned Examples and Comparative Examples were evaluated with respect to ordinary-temperature sintering properties of metal fine particles therein as well as electrical conductivity and bending resistance thereof by the following methods. The results are shown in Table 2.

<Evaluation of Ordinary-Temperature Sintering Properties>

The respective electrically conductive members obtained in the aforementioned Examples and Comparative Examples were cut vertically from its surface opposed to the surface on which the electrically conductive images were formed, using a stainless steel razor (76 razor for ordinary use; blade thickness: 76 μm) available from FEATHER Safety Razor Co., Ltd.

Then, the thus cut member was attached to an SEM stage "Type-T" available from Nisshin EM Co., Ltd., using a carbon double-sided adhesive tape for SEM (aluminum substrate; catalogue No. 732) available from Nisshin EM Co., Ltd., and the cut section of the member was observed using a field emission-type scanning electron microscope (FE-SEM) "Model: S-4800" available from Hitachi Limited under the conditions of SEM mode and an accelerated voltage of 10 KV to thereby obtain a secondary electron image thereof. The thus obtained secondary electron image was examined to ascertain whether or not the silver fine particles underwent necking therebetween and were sintered to each other.

<Measurement of Volume Resistivity ρv>

The respective electrically conductive members obtained in the aforementioned Examples and Comparative Examples were stored under the environmental conditions of a temperature of 25° C. and a relative humidity of 50% RH for 24 hours after being subjected to the printing. The thus stored respective electrically conductive members were cut into a size of 1 cm×2 cm by the aforementioned stainless steel razor. Then, the resistivity of the thus obtained cut sample was measured by a resistivity meter (body: "Loresta-GP"; four-point probe: PSP probe, both available from Mitsubishi Chemical Analytech Co., Ltd.), upon which the thickness (t) of the electrically conductive images on the respective members separately measured by the following method was input to the aforementioned resistivity meter to display a volume resistivity thereof.

The same measurement as described above was conducted at the other positions of the sample to determine a volume resistivity pv of the sample as an arithmetic mean of the 10 measured resistivity values in total.

[Measurement of Thickness of Electrically Conductive Images]

The respective electrically conductive members obtained in the aforementioned Examples and Comparative Examples were stored under the environmental conditions of a temperature of 25° C. and a relative humidity of 50% RH for 1 hour after being subjected to the printing. The thus stored respective electrically conductive members were observed by the same method as described above using a field emission-type scanning electron microscope, thereby obtaining a secondary electron image thereof. The coating film thickness of the electrically conductive images in the thus obtained secondary electron image was measured at 10 positions thereon to determine a thickness (t) of the electrically conductive images as an arithmetic mean of the 10 measured thickness values.

<Bending Resistance>

The respective electrically conductive members obtained in the aforementioned Examples and Comparative Examples were wound around a polystyrene bar having a diameter of 5 mm, and maintained as such in the wound state under the environmental conditions of a temperature of 25° C. and a relative humidity of 50% RH for 1 hour. Thereafter, the respective electrically conductive members were unwound from the polystyrene bar, and the surface of the electrically conductive images formed thereon was wiped with a soft cloth, and then examined to determine whether any missing portion of the electrically conductive images was present or not. In the case where any missing portion of the electrically conductive images was present, a maximum length (mm) of the missing portion of the electrically conductive images was measured as an index of the bending resistance of the respective electrically conductive members. Meanwhile, if any missing portion of the electrically conductive images was not present, the maximum length of the missing portion of the electrically conductive images was regarded as being 0 mm. The smaller the maximum length of the missing portion of the electrically conductive images becomes, the more excellent the bending resistance of the electrically conductive member is.

TABLE 2-1

| | | Ex. 1<br>Ink 1 | Com.<br>Ex. 1-1<br>Ink 2 | Com.<br>Ex. 1-2<br>Ink 2 | Ex. 2<br>Ink 3 | Ex. 3<br>Ink 4 | Com.<br>Ex. 2<br>Ink 5 | Ex. 4<br>Ink 6 | Ex. 5<br>Ink 7 |
|---|---|---|---|---|---|---|---|---|---|
| Kind of metal fine particle dispersion | | Silver fine particle dispersion 1 | Silver fine particle dispersion 2 | Silver fine particle dispersion 2 | Silver fine particle dispersion 3 | Silver fine particle dispersion 1 | Silver fine particle dispersion 4 | Silver fine particle dispersion 3 | Silver fine particle dispersion 1 |
| Composition of electrically conductive ink (% by mass) | Silver | 10.0 | 10.0 | 10.0 | 10.0 | 10.0 | 10.0 | 10.0 | 10.0 |
| | Polymer B | 1.0 | (1.0)*[1] | (1.0)*[1] | 1.0 | 1.0 | (1.0)*[2] | 1.0 | 1.0 |
| | Monohydroxyacetone | 0.7 | 0.5 | 0.5 | 0.0 | 6.0 | 0.6 | 0.7 | 0.7 |
| | Acetic acid | 0.5 | 0.3 | 0.3 | 0.5 | 0.5 | 0.4 | 0.0 | 6.0 |
| | PG | 14.6 | 16.4 | 16.4 | 14.6 | 14.6 | 14.6 | 14.6 | 14.6 |
| | Ion-exchanged water | 73.3 | 71.8 | 71.8 | 73.9 | 68.0 | 73.4 | 73.7 | 67.7 |
| | Total | 100.0 | 100.0 | 100.0 | 100.0 | 100.0 | 100.0 | 100.0 | 100.0 |
| Tg (° C.) of polymer B | | −68 | 100 | 100 | −68 | −68 | No Tg detected | −68 | −68 |
| Average particle size (nm) of metal fine particles (a) in electrically conductive ink | | 28 | 41 | 41 | 30 | 28 | 38 | 28 | 28 |
| Content (ppm) of nitrate ions in electrically conductive ink | | 0 | 0 | 0 | 3 | 0 | 0 | 3 | 0 |

Note
*[1]Dextrin was used in place of the polymer B.
*[2]Succinic acid was used in place of the polymer B.

TABLE 2-2

|  |  | Ex. 1<br>Ink 1 | Com. Ex. 1-1<br>Ink 2 | Com. Ex. 1-2<br>Ink 2 | Ex. 2<br>Ink 3 |
|---|---|---|---|---|---|
| Substrate | Kind | KA4100PSKR | KA4100PSKR | KA4100PSKR | KA4100PSKR |
|  | Average pore size (nm) of porous surface of substrate | 50 | 50 | 50 | 50 |
|  | 8° Gloss value of surface of substrate | 24 | 24 | 25 | 24 |
| Temperature (° C.) upon forming electrically conductive images |  | 25 | 120 | 25 | 25 |
| Kind of electrically conductive member |  | Electrically conductive member 1 | Electrically conductive member 2-1 | Electrically conductive member 2-2 | Electrically conductive member 3 |
| Contact angle (°) of water on electrically conductive images |  | 104 | 22 | 22 | 75 |
| Evaluation | Ordinary-temperature sintering properties | Yes | No | No | Yes |
|  | Volume resistivity $\rho v$ ($\Omega \cdot$ cm) after being allowed to stand at 25° C. under 50% RH for 24 hours | $2.0 \times 10^{-5}$ | $5.3 \times 10^{-5}$ | Not measurable (high resistance) | $4.2 \times 10^{-5}$ |
|  | Bending resistance (maximum length (mm) of missing portion of electrically conductive images | 0 | 4.8 | 0.8 | 3.8 |

|  |  | Ex. 3<br>Ink 4 | Com. Ex. 2<br>Ink 5 | Ex. 4<br>Ink 6 | Ex. 5<br>Ink 7 |
|---|---|---|---|---|---|
| Substrate | Kind | KA4100PSKR | KA4100PSKR | KA4100PSKR | KA4100PSKR |
|  | Average pore size (nm) of porous surface of substrate | 50 | 50 | 50 | 50 |
|  | 8° Gloss value of surface of substrate | 24 | 24 | 24 | 24 |
| Temperature (° C.) upon forming electrically conductive images |  | 25 | 25 | 25 | 25 |
| Kind of electrically conductive member |  | Electrically conductive member 4 | Electrically conductive member 5 | Electrically conductive member 6 | Electrically conductive member 7 |
| Contact angle (°) of water on electrically conductive images |  | 100 | 31 | 91 | 96 |
| Evaluation | Ordinary-temperature sintering properties | Yes | Yes | Yes | Yes |
|  | Volume resistivity $\rho v$ ($\Omega \cdot$ cm) after being allowed to stand at 25° C. under 50% RH for 24 hours | $2.1 \times 10^{-5}$ | $6.2 \times 10^{-5}$ | $2.7 \times 10^{-5}$ | $2.3 \times 10^{-5}$ |
|  | Bending resistance (maximum length (mm) of missing portion of electrically conductive images | 1.3 | 5.3 | 0.5 | 1.0 |

From the results shown in Table 2, it was confirmed that the electrically conductive members obtained in Examples 1 to 5 exhibited ordinary-temperature sintering properties of metal fine particles therein and were excellent in electrical conductivity and bending resistance, as compared to the electrically conductive members obtained in Comparative Examples 1-1 and 1-2 and Comparative Example 2.

On the other hand, it was confirmed that in Comparative Examples 1-1 and 1-2, since dextrin was used as the dispersant, the resulting electrically conductive members failed to exhibit ordinary-temperature sintering properties of metal fine particles therein. In addition, it was confirmed that in Comparative Example 1-1, although the electrically conductive member produced under ordinary-temperature environments was further heated at 120° C. for 1 hour, the resulting electrically conductive member was deteriorated in both of electrical conductivity and bending resistance as compared to the electrically conductive members obtained in Examples 1 to 5.

It was also confirmed that in Comparative Example 2 in which succinic acid was used as the dispersant, the resulting electrically conductive member exhibited ordinary-temperature sintering properties of metal fine particles therein, but was deteriorated in both of electrical conductivity and bending resistance as compared to the electrically conductive members obtained in Examples 1 to 5.

INDUSTRIAL APPLICABILITY

According to the present invention, it is possible to obtain an electrically conductive member that can exhibit ordinary-temperature sintering properties of metal fine particles therein, and is excellent in electrical conductivity and bending resistance, and therefore can be suitably used in various application fields.

The invention claimed is:
1. A method for producing an electrically conductive member, the method comprising applying an electrically conductive ink comprising a metal fine particle dispersion to a substrate to form electrically conductive images on the substrate under environments in a temperature range of not lower than 5° C. and not higher than 45° C., thereby obtaining the electrically conductive member,
- wherein the metal fine particle dispersion comprises metal fine particles (a) dispersed therein with a polymer B;
- a metal constituting the metal fine particles (a) is silver,
- an average particle size of the metal fine particles (a) in the electrically conductive ink is not less than 15 nm and not more than 35 nm,
- the polymer B is a water-soluble vinyl polymer comprising a constitutional unit derived from (meth)acrylic acid and a constitutional unit derived from a polyalkylene glycol monoester of (meth)acrylic acid,
- a glass transition temperature of the polymer B is not higher than a temperature at which the electrically conductive images are formed on the substrate,
- the glass transition temperature of the polymer B is not lower than −100° C. and not higher than 10° C.; and
- the substrate has a porous surface, and
- wherein the electrically conductive ink comprises monohydroxyacetone and acetic acid, and
- a content of the monohydroxyacetone in the electrically conductive ink is not less than 0.05% by mass and not more than 1% by mass.

2. The method for producing an electrically conductive member according to claim 1, wherein an average pore size of the porous surface of the substrate is not less than 10 nm and not more than 200 nm.

3. The method for producing an electrically conductive member according to claim 1, wherein the substrate is a substrate that comprises a support body and an inorganic fine particle-containing layer formed on a surface of the support body.

4. The method for producing an electrically conductive member according to claim 1, wherein the electrically conductive ink further comprises at least one organic solvent selected from the group consisting of acetone, methyl ethyl ketone, tetrahydrofuran, ethyl acetate, 1-propanol and propylene glycol, as an organic solvent C.

5. The method for producing an electrically conductive member according to claim 1, wherein the electrically conductive ink further comprises propylene glycol, as an organic solvent C.

6. The method for producing an electrically conductive member according to claim 1, wherein the electrically conductive ink comprises substantially no nitrate ions.

7. The method for producing an electrically conductive member according to claim 1, wherein a content of a monocarboxylic acid having not less than 1 and not more than 24 carbon atoms in the electrically conductive ink is not less than 0.05% by mass and not more than 10% by mass.

8. The method for producing an electrically conductive member according to claim 1, wherein the electrically conductive images are formed by ink jet printing with an inkjet head at a temperature of not lower than 5° C. and not higher than 45° C.

9. The method for producing an electrically conductive member according to claim 1, wherein a method of applying the electrically conductive ink to the substrate is an ink-jet printing method.

10. A method for producing an electrically conductive member, the method comprising applying an electrically conductive ink comprising a metal fine particle dispersion to a substrate to form electrically conductive images on the substrate under environments in a temperature range of not lower than 5° C. and not higher than 45° C., thereby obtaining the electrically conductive member,
wherein:
- the metal fine particle dispersion comprises metal fine particles (a) dispersed therein with a polymer B;
- a metal constituting the metal fine particles (a) is silver,
- an average particle size of the metal fine particles (a) contained in the metal fine particle dispersion is not less than 15 nm and not more than 35 nm,
- the metal fine particle dispersion comprises monohydroxyacetone and acetic acid;
- the polymer B is a water-soluble vinyl polymer comprising a constitutional unit derived from (meth)acrylic acid and a constitutional unit derived from a polyalkylene glycol monoester of (meth)acrylic acid;
- a glass transition temperature of the polymer B is not higher than a temperature at which the electrically conductive images are formed on the substrate;
- the glass transition temperature of the polymer B is not lower than −100° C. and not higher than 10° C.;
- the electrically conductive images are formed by ink jet printing with an inkjet head at a temperature of not lower than 5° C. and not higher than 45° C.; and
- the substrate has a porous surface, and
- wherein a content of the monohydroxyacetone in the electrically conductive ink is not less than 0.05% by mass and not more than 1% by mass.

11. The method for producing an electrically conductive member according to claim 10, wherein a content of the acetic acid in the electrically conductive ink is not less than 0.05% by mass and not more than 10% by mass.

* * * * *